US010087535B2

(12) United States Patent
Friedman et al.

(10) Patent No.: US 10,087,535 B2
(45) Date of Patent: Oct. 2, 2018

(54) DEVICES AND METHODS FOR PHOTOELECTROCHEMICAL WATER SPLITTING

(71) Applicant: Alliance for Sustainable Energy, LLC, Golden, CO (US)

(72) Inventors: Daniel Joseph Friedman, Lakewood, CO (US); Todd Gregory Deutsch, Westminster, CO (US); John A. Turner, Broomfield, CO (US); Henning Doscher, Bad Bederkesa (DE); James Luke Young, Boulder, CO (US); Myles Steiner, Denver, CO (US); Ryan Matthew France, Golden, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 222 days.

(21) Appl. No.: 15/078,206

(22) Filed: Mar. 23, 2016

(65) Prior Publication Data
US 2016/0281247 A1 Sep. 29, 2016

Related U.S. Application Data

(60) Provisional application No. 62/137,146, filed on Mar. 23, 2015.

(51) Int. Cl.
*C25B 9/08* (2006.01)
*C25B 1/10* (2006.01)
*C25B 1/00* (2006.01)

(52) U.S. Cl.
CPC ............... *C25B 9/08* (2013.01); *C25B 1/003* (2013.01); *Y02E 60/368* (2013.01); *Y02P 20/134* (2015.11); *Y02P 20/135* (2015.11)

(58) Field of Classification Search
CPC ...... Y02E 60/368; Y02P 20/135; C25B 1/003
See application file for complete search history.

(56) References Cited

U.S. PATENT DOCUMENTS

| 4,466,869 A | * | 8/1984 | Ayers | C25B 1/003 204/157.52 |
| 4,688,068 A | * | 8/1987 | Chaffin | B82Y 20/00 136/249 |

(Continued)

FOREIGN PATENT DOCUMENTS

DE 10 2014 105 545 B3 7/2015
WO WO 2006110613 A2 10/2006
(Continued)

OTHER PUBLICATIONS

Galliumn Arsenide (GaAs) Doping Process, from Circuits Today, Mar. 2011, accessed at http://www.circuitstoday.com/gallium-arsenide-gaas-doping-process on Feb. 2, 2018, and date verified on http://archive.org/web/ (Year: 2011).*

(Continued)

*Primary Examiner* — Harry D Wilkins, III
(74) *Attorney, Agent, or Firm* — Michael A. McIntyre

(57) ABSTRACT

The present disclosure relates to photoelectrochemical devices and systems for capturing the energy of electromagnetic radiation and utilizing the captured energy for electrolysis to produce hydrogen gas and oxygen gas.

23 Claims, 10 Drawing Sheets

(56) References Cited

U.S. PATENT DOCUMENTS

| | | | | |
|---|---|---|---|---|
| 4,706,377 | A | * | 11/1987 | Shuskus .............. H01L 21/2654 |
| | | | | 148/DIG. 84 |
| 5,770,868 | A | * | 6/1998 | Gill ................... H01L 21/02395 |
| | | | | 257/190 |
| 6,281,426 | B1 | | 8/2001 | Olson et al. |
| 6,558,995 | B1 | * | 5/2003 | Gilliland ................ B82Y 10/00 |
| | | | | 257/14 |
| 6,936,143 | B1 | * | 8/2005 | Graetzel ................. C25B 1/003 |
| | | | | 204/242 |
| 8,067,687 | B2 | | 11/2011 | Wanlass |
| 8,388,818 | B1 | * | 3/2013 | Menezes ................. C25B 1/003 |
| | | | | 204/248 |
| 8,691,068 | B1 | | 4/2014 | Huang et al. |
| 8,962,993 | B2 | * | 2/2015 | Jones-Albertus ....... H01L 31/06 |
| | | | | 136/262 |
| 2007/0246370 | A1 | | 10/2007 | Dimroth |
| 2007/0277875 | A1 | | 12/2007 | Gadkaree et al. |
| 2009/0014061 | A1 | | 1/2009 | Harris, Jr. et al. |
| 2009/0078310 | A1 | | 3/2009 | Stan et al. |
| 2011/0232730 | A1 | | 9/2011 | Jones et al. |
| 2012/0267234 | A1 | | 10/2012 | Reece et al. |
| 2013/0118546 | A1 | * | 5/2013 | Jones-Albertus ....... H01L 31/06 |
| | | | | 136/244 |
| 2013/0269761 | A1 | | 10/2013 | Ardo et al. |
| 2014/0332374 | A1 | | 11/2014 | Deutsch et al. |

FOREIGN PATENT DOCUMENTS

| | | |
|---|---|---|
| WO | WO 2011116750 A2 | 9/2011 |
| WO | WO 2011123164 A1 | 10/2011 |

OTHER PUBLICATIONS

Xu et al, Solid-liquid Equilibria for III-V Quinary Alloy Semiconductors, Solid State Communications, vol. 103, No. 7, pp. 417-420, Aug. 1997 (Year: 1997).*

Turner et al, "Semiconductor Materials for Photoelectrolysis", DOE Hydrogen Program Annual Merit Review, May 12, 2011, accessed at http://www.hydrogen.energy.gov/pdfs/review11/pd035_turner_2011_o.pdf, pp. 1-31 (Year: 2011).*

Law et al, Future technology pathways of terrestrial III-V multijunction solar cells for concentrator photovoltaic systems, Solar Energy Materials & Solar Cells, vol. 94, No. 8, Aug. 2010, pp. 1314-1318 (Year: 2010).*

Dimroth et al, MOVPE Grown Ga1-xInxAs Solar Cells for GaInP/GaInAs Tandem Applications, Journal of Electronic Materials, vol. 29, No. 1, Jan. 2000, pp. 42-46 (Year: 2000).*

May et al, Efficient direct solar-to-hydrogen conversion by in situ interface transformation of a tandem structure, Nature Communications, vol. 6, Sep. 2015, pp. 1-7 (Year: 2015).*

Young et al, Direct solar-to-hydrogen conversion via inverted metamorphic multi-junction semiconductor architectures, Nature Energy, vol. 2, No. 4, pp. 17028 (Year: 2017).*

Benck, J., et al., "Designing Active and Stable Silicon Photocathodes for Solar Hydrogen Production Using Molybdenum Sulfide Nanomaterials", Advsnce Energyu Materials, vol. 4, Issue 18, Dec. 29, 2014, 1400739, 8 pages.

Bertness, K., et al., "29.5%-efficient GaInP/GaAS tandem solar cells", Applied Physics Letters, vol. 65, Issue 8, Aug. 22, 1994, pp. 989-991.

Brillet, J., et al., "Highly efficient water splitting by a dual-absorber tandem cell", Nature Photonics, vol. 6, Issue 12, Dec. 2012, pp. 824-828.

Doscher, H., et al., "Direct solar water splitting with inverted metamorphic III-V multi-junction devices", IPS-20 Berlin, Germany, Jul. 28, 2014, pp. 1-20.

Doscher, H., et al., "Sunlight absorption in water-efficiency and design implications for photoelectrochemical devices", Energy & Environmental Science, vol. 7, Issue 9, Sep. 2014, pp. 2951-2956.

Doscher, H., et al., "Solar-to-hydrogen efficiency: shining light on photoelectrochemical device performance", Energy & Environmental Science, vol. 9, Issue 1, Jan. 2016, pp. 74-80.

Friedman, D., et al., "1-eV solar cells with GaInNAs active layer", Journal of Crystal Growth, vol. 195, Issues 1-4, Dec. 15, 1998, pp. 409-415.

Gao, X., et al., "Photoelectrochemical decomposition of water using modified monolithic tandem cells", International Journal of Hydrogen Energy, vol. 24, Issue 4, Apr. 1999, pp. 319-325.

Geisz, J., et al., "Photocurrent of 1 eV GaInNAs lattice-matched to GaAs", Journal of Crystal Growth, vol. 195, Issues 1-4, Dec. 15, 1998, pp. 401-408.

Geisz, J., et al., "40.8% efficient inverted triple junction solar cell with two independently metamorphic junctions", Applied Physics Letters, vol. 93, Issue12, Sep. 22, 2008, pp. 123505-1-123505-3.

Hisatomi, T., et al., "Recent advances in semiconductors for photocatalytic and photoelectrochemical water splitting", Chemical Society Reviews, vol. 43, Issue 22, Nov. 2014, pp. 7520-7535.

Jackrel, B., et al., "Dilute nitride GaInNAs and GaInNAsSb solar cells by molecular beam epitaxy", Journal of Applied Physics, vol. 101, Issue 11, Jun. 1, 2007, pp. 114916-1-114916-8.

Jeon, H., et al., "Solar-hydrogen Production by a Monolithic Photovoltaic-electrolytic Cell", Journal of Electrochemical Science and Technology, vol. 3., Issue 4, Dec. 2012, pp. 149-153.

Khaselev, O., et al., "A Monolithic Photovoltaic-Photoelectrochemical Device for Hydrogen Production via Water Splitting", Science, vol. 280, Apr. 17, 1998, pp. 425-427.

Khaselev, O., et al., "High-efficiency integrated multijunction photovoltaic/electrolysis systems for hydrogen production", International Journal of Hydrogen Energy, vol. 26, Issue 2, Feb. 2001, pp. 127-132.

Kocha, S., et al., "Photoelectrochemical decomposition of water utilizing monolithic tandem cells", Solar Energy Materials and Solar Cells, vol. 52, Issues 3-4, Apr. 1998, pp. 389-397.

Lee, M., et al., "p-Type InP Nanopillar Photocathodes for Efficient Solar-Driven Hydrogen Production", Angew. Chem. Inter. Ed. Engl., vol. 51, Issue 43, Oct. 22, 2012, pp. 10760-10764.

Licht, S., et al., "Over 18% solar energy conversion to generation of hydrogen fuel; theory and experiment for efficient solar water splitting", International Journal of Hydrogen Energy, vol. 26, Issue 7, Jul. 2001, pp. 653-659.

May, M., et al., "Efficient Direct Solar-to-Hydrogen Conversion by In Situ Interface Transformation of a Tandem Structure", Nature Communications, vol. 6, Sep. 15, 2015, pp. 1-24.

Oh, J., et al., "Nanoporous black silicon photocathode for $H_2$ production by photoelectochemical water splitting", Energy & Environmental Science, vol. 4, Apr. 5, 2011, pp. 1690-1964.

Pinaud, B., et al., "Technical and economic feasibility of centralized facilities for solar hydrogen production via photocatalysis and potelectrochemistry", Energy & Environmental Science, vol. 6, Jun. 12, 2013, pp. 1983-2002.

Prevot, M., et al., "Photoelectrochemical Tandem Cells for Solar Water Splitting", The Journal of Physical Chemistry, vol. 117, Jul. 26, 2013, pp. 17879-17893.

Ptak, A., et al., "Low-acceptor-concentration GaInNAs grown by molecular-beam epitaxy for high-current p-i-n solar cell applications", Journal of Applied Physics, vol. 98, Issue 9, Nov. 1, 2005, pp. 094501-1-094501-5.

Seger, B., et al., Using $TiO_2$ as a Conductive Protective Layer for Photocathodic $H_2$ Evolution, Journal of the American Chemical Society, vol. 135, January, Issue 3, Jan. 23, 2013, pp. 1057-1064.

Seger, B., et al., "2-Photon tandem device for water splitting: comparing photocathode first versus photoanode first designs", Energy & Environmental Science, vol. 7, Issue 8, Aug. 2014, pp. 2397-2413.

Wanlass, M., et al., "Lattice-Mismatched Approaches for High-Performance, III-V Photovoltaic Energy Converters", presented at the $31^{ST}$ IEEE Photovoltaics Specialists Conference and Exhibition, Jan. 3-7, 2005, Lake Buena Vista, Florida, pp. 530-535.

Weber, M., et al., "Splitting Water With Semiconducting Photoelectrodes-Efficiency Considerations", International Journal of Hydrogen Energy, vol. 11, No. 4, 1986, pp. 225-232.

(56) References Cited

OTHER PUBLICATIONS

Wiemer, M. et al., "43.5% Efficient Lattice Matched Solar Cells", SPIE Proceedings, vol. 8108, High and Low Concentrator Systems for Solar Electric Applications VI, Aug. 21, 2011, San Diego, California, pp. 810804-1-810804-5.
PV-TECH, "Solar Junction enters multi-megawatt supply agreement with Semprius", Feb. 6, 2012, http://www.pv-tech.org/news/solar_junction_enters_multi_megawatt_supply_agreement_with_semprius.
PV-TECH, "IQE invests over £10.5 million into Solar Junction", Feb. 9, 2012, http://www.pv-tech.org/news/iqe_invests_over_10.5_million_into_solar_junction.
Semiconductor Today, "Solar Junction hits record 43.5% efficiency for CPV production cell", Apr. 14, 2011, http://sjsolar.com/downloads/Solar_Junction_World_Record_%20Efficiency_14April11.pdf.

\* cited by examiner

DEVICES AND METHODS FOR PHOTOELECTROCHEMICAL WATER SPLITTING

CROSS-REFERENCE TO RELATED APPLICATIONS

This application claims the benefit of U.S. Provisional Application No. 62/137,146 filed Mar. 23, 2015, the contents of which are incorporated herein by reference in their entirety.

CONTRACTUAL ORIGIN

The United States Government has rights in this disclosure under Contract No. DE-AC36-08GO28308 between the United States Department of Energy and the Alliance for Sustainable Energy, LLC, the Manager and Operator of the National Renewable Energy Laboratory.

BACKGROUND

Water splitting refers to the chemical reaction of water to its constituent elements in the form of diatomic hydrogen and diatomic oxygen. Photoelectrochemical (PEC) water splitting is a promising pathway to the economical production of solar hydrogen. Using a semiconductor to directly split water eliminates the high capital costs of an electrolyzer. The key parameters that dictate hydrogen costs from the PEC approach are semiconductor efficiency, stability, and cost. Technoeconomic analysis for PEC hydrogen production reveals that high solar-to-hydrogen (STH) efficiency is the most critical figure of merit when designing such a system.

Over the last four decades, researchers have evaluated transition metal oxide semiconductors for PEC water splitting. However, wide bandgaps and poor optoelectronic properties limit their efficiencies to a few percent, precluding them from approaching the efficiencies necessary for economical large-scale manufacturing and use. Hybrid photoelectrodes, with a transition metal oxide photoanode mechanically stacked on a photovoltaic (PV) device, have recently achieved 3.1% and 4.9% solar-to-hydrogen conversion efficiencies, which are close to the upper limits accessible based on the properties of the $WO_3$ and $BiVO_4$ anodes incorporated by these systems.

Dual PEC junction III-V-based systems, constructed with p-InP coupled to an n-GaAs photoanode, have achieved STH efficiencies up to 8%. A related art is the $GaInP_2$/GaAs tandem cell, which achieved up to about 12.4% STH at short-circuit and up to about 16% STH with a small (240 mV) bias (see Khaselev, O.; Turner, J.; Science 1998, 280, 425-7 and Turner, J. A.; Deutsch, T. G., http://www.hydrogen.energy.gov/pdfs/review11/pd035_turner_2011_o.pdf). However, despite these commendable successes, significant improvements are still needed before PEC technology for water-splitting can be considered a viable and economical method for hydrogen fuel production.

SUMMARY

An aspect of the present disclosure is a photoelectrochemical device that includes a first electrode having, in order, a first absorber layer including $Al_xGa_yIn_zAs_vP_w$, a second absorber layer including $In_tGa_uAs$, and a contact layer including at least one reflective metal, where the first absorber layer includes a p-type layer, the second absorber layer includes an n-type and a p-type layer, and x is between 0.0 and 1.0, y is between 0.0 and 1.0, z is between 0.0 and 1.0, v is between 0.0 and 1.0, w is between 0.0 and 1.0, t is between 0.0 and 1.0, u is between 0.0 and 1.0, and x+y+z=v+w=t+u=1.0. In some embodiments of the present disclosure, the first absorber layer may have a bandgap between about 1.6 eV and about 1.8 eV. In some embodiments of the present disclosure, the second absorber layer may have a bandgap between about 0.9 eV to about 1.2 eV. In some embodiments of the present disclosure, x=w=0.0, y may be between about 0.4 and about 1.0, and z may be between about 0.4 and about 1.0. In some embodiments of the present disclosure, y may be about 0.5.

In some embodiments of the present disclosure, the p-type layer of the first absorber layer may include a first dopant that includes at least one of zinc, beryllium, magnesium, and/or carbon. In some embodiments of the present disclosure, the first absorber layer may further include 4 an n-type layer positioned on the p-type layer of the first absorber layer. In some embodiments of the present disclosure, the n-type layer of the first absorber layer may include a second dopant that includes at least one of selenium, silicon, tellurium, sulfur, and/or germanium. In some embodiments of the present disclosure, the first absorber layer may have a thickness between about 500 nm and about 3000 nm. In some embodiments of the present disclosure, t may be between about 0.15 and about 0.35. In some embodiments of the present disclosure, t may be about 0.15.

In some embodiments of the present disclosure, the p-type layer of the second absorber layer may include a third dopant that includes at least one of zinc, beryllium, magnesium, and/or carbon. In some embodiments of the present disclosure, the n-type layer of the second absorber layer may include a fourth dopant that includes at least one of selenium, silicon, sulfur, and/or germanium. In some embodiments of the present disclosure, the second absorber layer may have a thickness between about 1000 nm and about 3000 nm. In some embodiments of the present disclosure, the reflective metal may include at least one of gold, silver, platinum, and/or copper.

In some embodiments of the present disclosure, the photoelectrochemical device may further include a tunnel junction positioned between the first absorber layer and the second absorber layer. In some embodiments of the present disclosure, the photoelectrochemical device may further include a graded buffer layer positioned between the first absorber layer and the second absorber layer. In some embodiments of the present disclosure, a lowest bandgap layer of the graded buffer layer may have a bandgap greater than about 0.9 eV. In some embodiments of the present disclosure, the lowest bandgap layer of the graded buffer layer may have a bandgap greater than about 1.2 eV.

In some embodiments of the present disclosure, the photoelectrochemical device may further include a catalyst layer positioned on the first absorber layer. In some embodiments of the present disclosure, the photoelectrochemical device may further include a catalyst layer positioned on the n-type layer of the first absorber layer. In some embodiments of the present disclosure, the catalyst layer may include at least one of molybdenum sulfide, graphene, quantum dots, carbon nanotubes, a perovskite, nickel, a nickel oxide, $NaTaO_3$:La, $K_3Ta_3B_2O_{12}$, a GaZnNO alloy, platinum, titanium dioxide, cobalt, bismuth, ruthenium, ruthenium dioxide, and/or an iridium oxide.

In some embodiments of the present disclosure, the photoelectrochemical device may further include a second electrode, where the first electrode and the second electrode are electrically connected. In some embodiments of the present disclosure, the photoelectrochemical device may further include an electrolyte positioned between the first electrode and the second electrode. In some embodiments of the present disclosure, the first absorber layer may further include nitrogen.

An aspect of the present disclosure is a system that includes a first electrode that includes, in order, a first catalyst layer, a first absorber layer that includes $Al_xGa_yIn_zAs_vP_w$, a second absorber layer that includes $In_tGa_uAs$, and a first contact layer that includes at least one reflective metal. The first absorber layer includes a p-type layer, the second absorber layer includes an n-type and a p-type layer, and x is between 0.0 and 1.0, y is between 0.0 and 1.0, z is between 0.0 and 1.0, v is between 0.0 and 1.0, w is between 0.0 and 1.0, t is between 0.0 and 1.0, u is between 0.0 and 1.0, and x+y+z=v+w=t+u=1.0. The system also includes a second electrode that includes a second catalyst layer, and a second contact layer. The system also includes an electrolyte in contact with the first catalyst and the second catalyst, a membrane positioned at a first side of the second electrode and between the first electrode and the second electrode, a barrier positioned at a second side of the second electrode, and a window physically connecting the membrane to the barrier. The first electrode and the second electrode are electrically connected by an electrical connection, and the second electrode, the barrier, and the window form an internal volume that contains the electrolyte and collects hydrogen gas.

DRAWINGS

Exemplary embodiments are illustrated in referenced figures of the drawings. It is intended that the embodiments and figures disclosed herein are to be considered illustrative rather than limiting.

Figure 3:
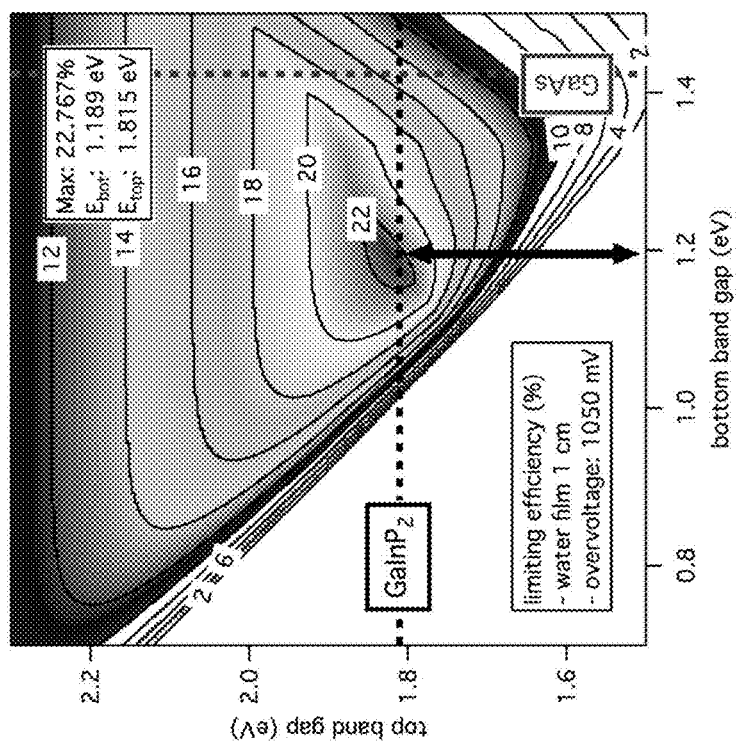

FIG. 3 displays theoretical limits for the STH efficiency for tandem PEC devices versus first and second absorber layer bandgap energies when illuminated through 1 cm of electrolyte and operated at a total of 1050 mV of overvoltage loss.

Figure 4:
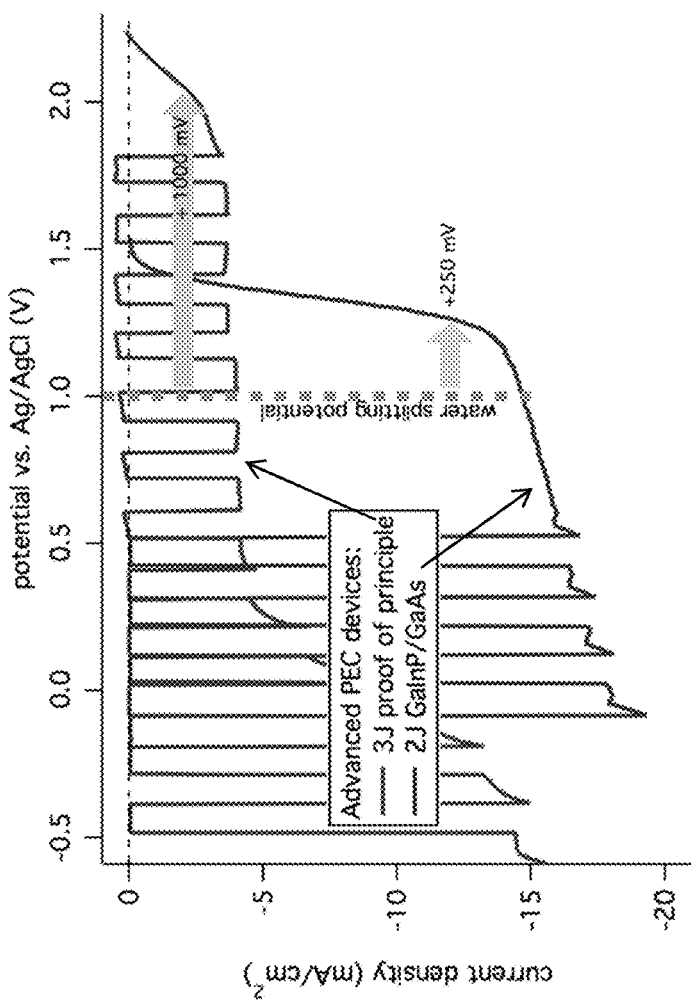

FIG. 4 summarizes current-voltage (I-V) characteristics of some of the advanced PEC devices described herein: laboratory based measurements of triple and double junction structures, according to some embodiments of the disclosure.

Figure 5:
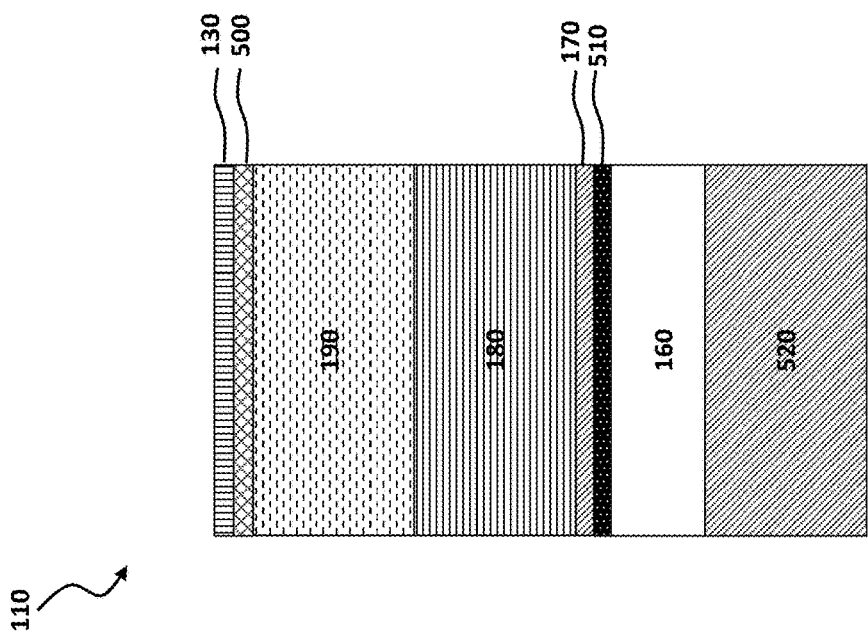

FIG. 5 a metamorphic tandem photoelectrochemical (PEC) water splitting device, according to some embodiments of the disclosure.

Figure 6:
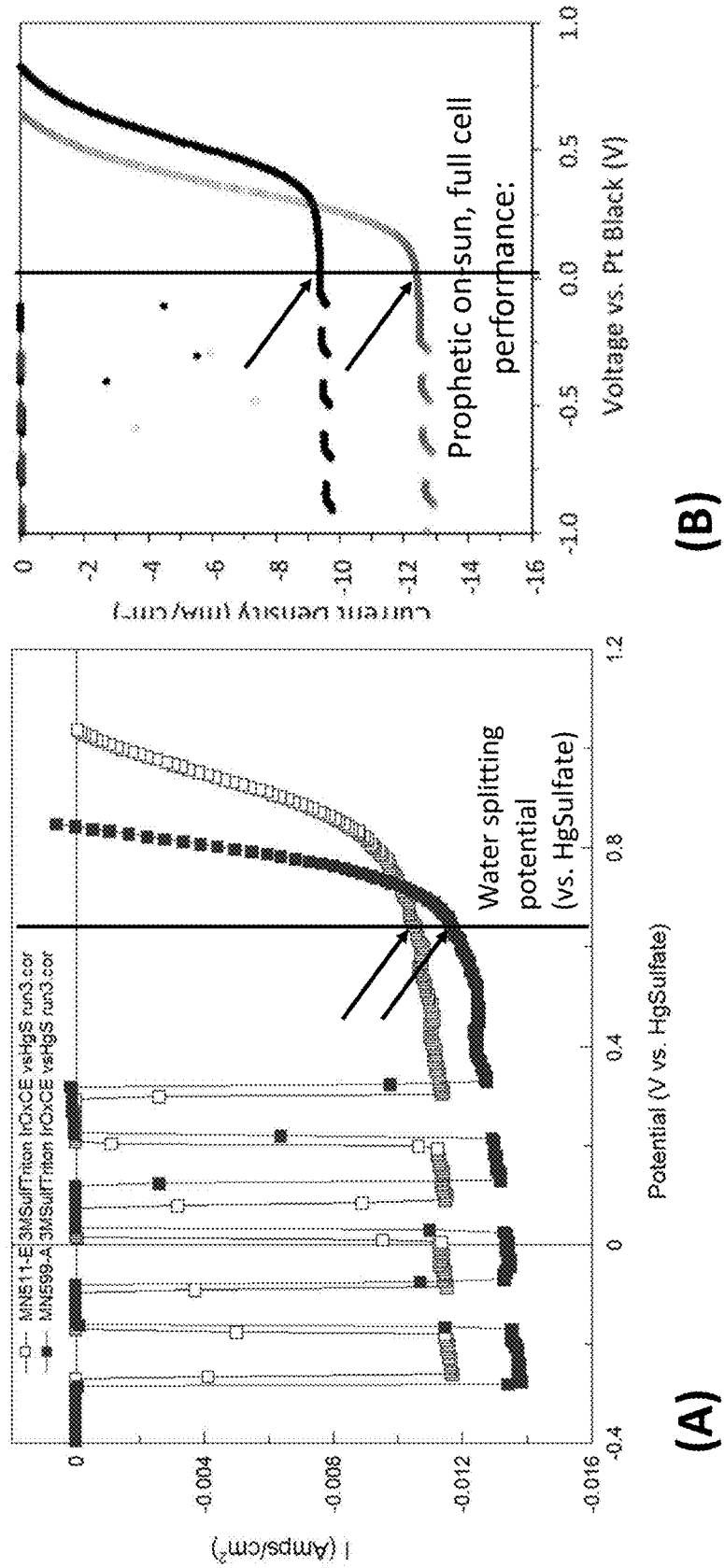

FIG. 6 compares performance data of an inverted metamorphic tandem PEC water splitting device, according to some embodiments of the disclosure, to performance data of a standard device.

Figure 7:
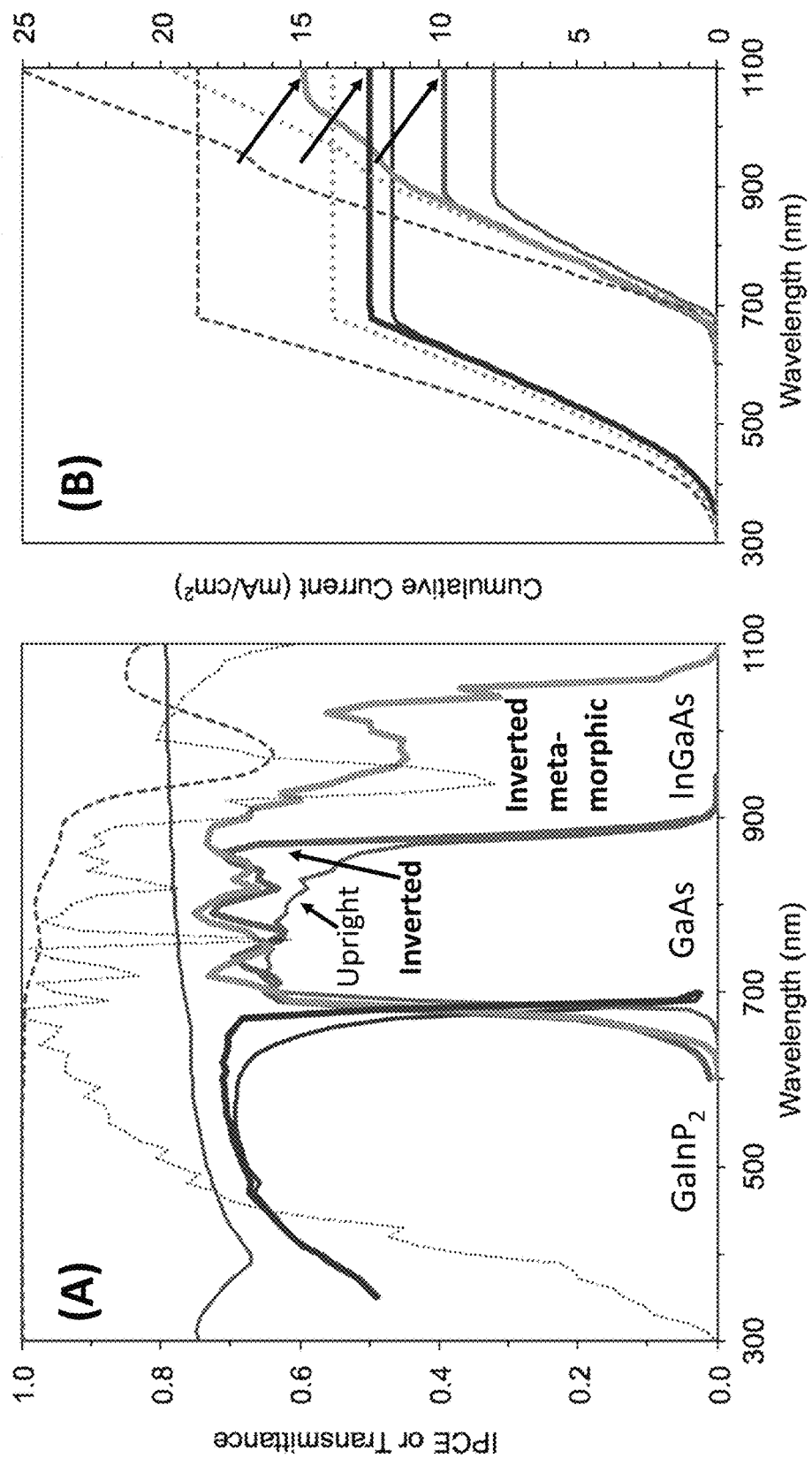

FIG. 7 compares performance data of an inverted metamorphic tandem PEC water splitting device, according to some embodiments of the disclosure, to performance data of a standard device.

Figure 8:
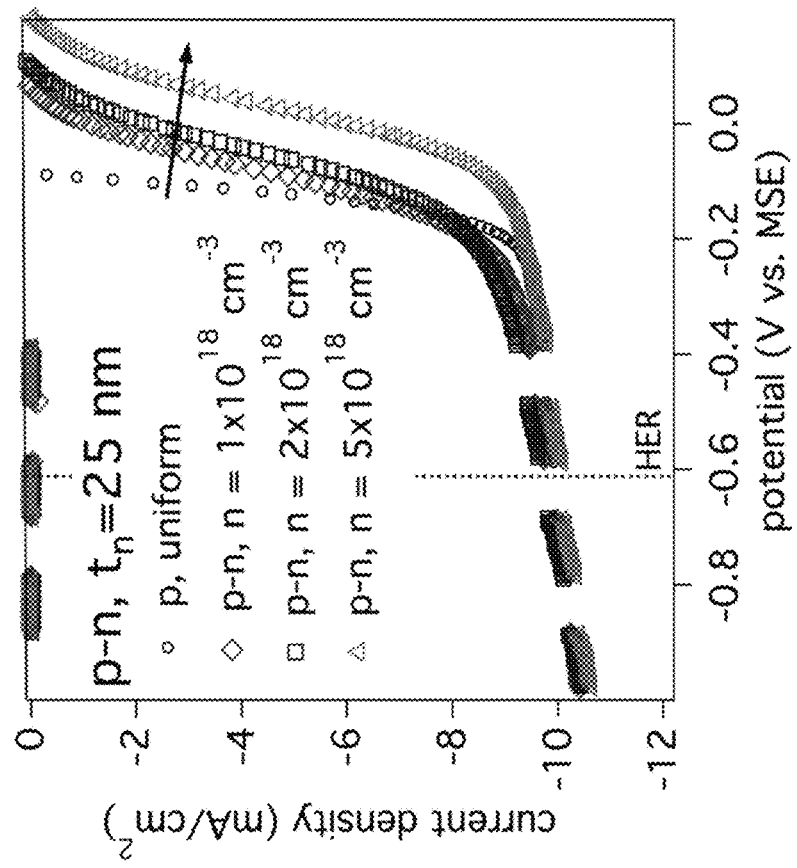

FIG. 8 illustrates photocurrent density data from first absorber layers only having a p-type layer, versus first absorber layers having an addition n-type layer deposited on the p-type layer, according to some embodiments of the present disclosure.

Figure 9:
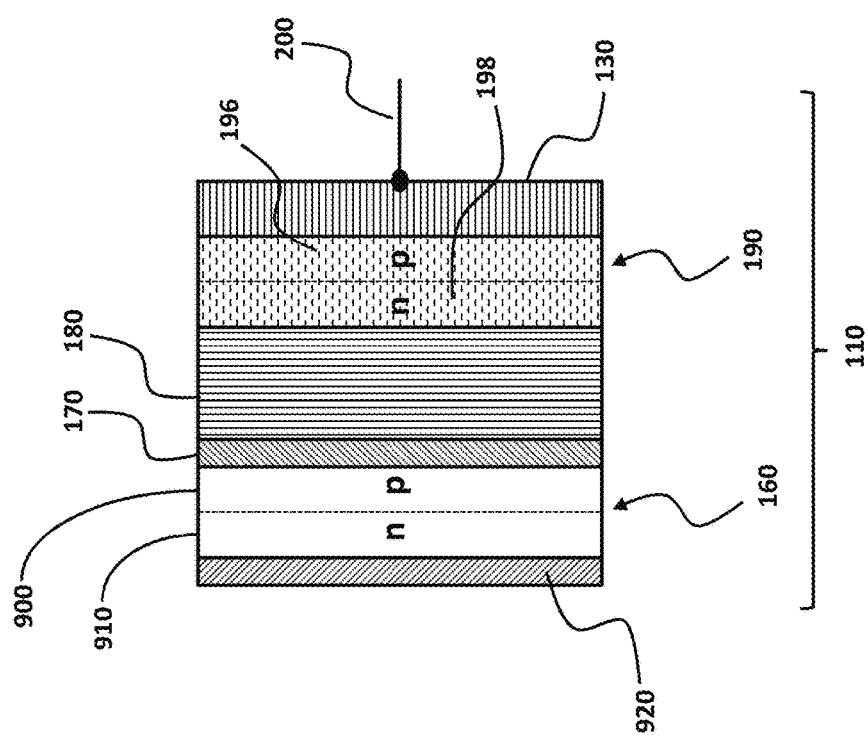

FIG. 9 illustrates a first electrode having a p-n-type first absorber layer, according to some embodiments of the present disclosure.

Figure 10:
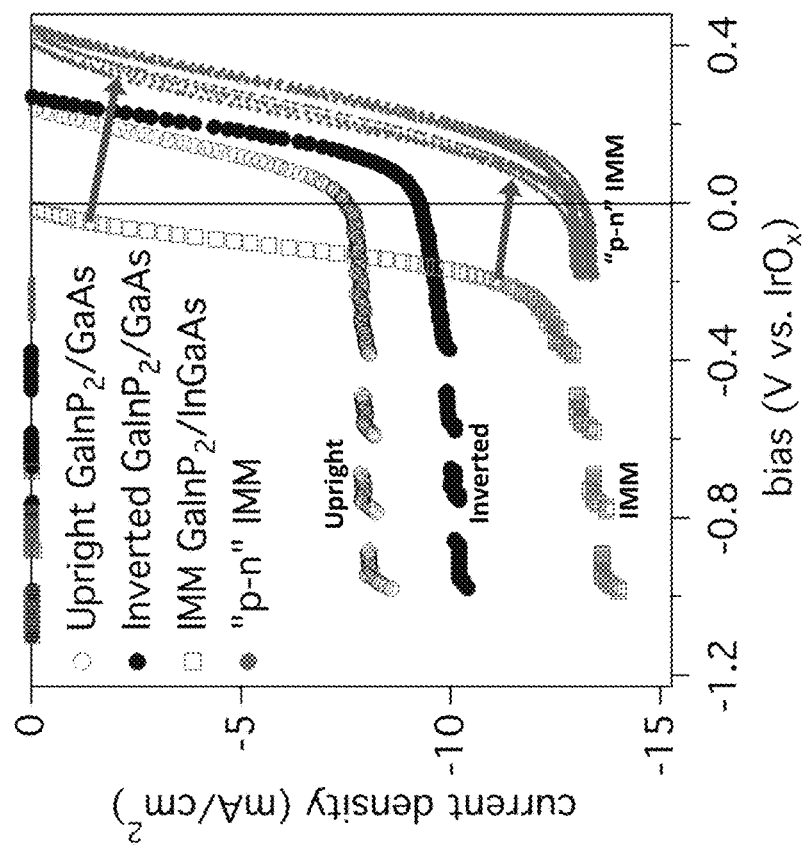

FIG. 10 illustrates device efficiency data for various electrode designs, including inverted metamorphic tandem cells having either a p-type first absorber layer or a p-n-type first absorber layer, according to some embodiments of the present disclosure.

REFERENCE NUMBERS

| | |
|---|---|
| 90 | photoelectrochemical device |
| 100 | second electrode |
| 110 | first electrode |
| 120 | Ohmic contact |
| 122 | first surface of second electrode |
| 130 | Ohmic contact |
| 140 | catalyst (for oxygen production) |
| 150 | catalyst (for hydrogen production) |
| 160 | first absorber layer (e.g. p-type cell, "high" bandgap) |
| 162 | second surface of p-type cell |
| 164 | first surface of p-type cell |
| 170 | tunnel junction |
| 172 | first surface of tunnel junction |
| 174 | second surface of tunnel junction |
| 180 | graded buffer layer |
| 182 | first surface of graded buffer layer |
| 184 | second surface of graded buffer layer |
| 190 | second absorber layer (e.g. p-n type cell, "low" bandgap) |
| 192 | first surface of p-n type cell |
| 194 | second surface of p-n type cell |
| 196 | p-type layer of p-n type cell |
| 198 | n-type layer of p-n type cell |
| 200 | electrical connection |
| 210 | electrolyte |
| 220 | electrolyte |
| 230 | membrane |
| 232 | first surface of membrane |
| 234 | second surface of membrane |
| 238 | system |
| 240 | window |
| 250 | barrier |
| 260 | insulator |
| 500 | first back surface field layer |
| 510 | second back surface field layer |
| 520 | substrate |
| 900 | p-type layer of first absorber layer |
| 910 | n-type layer of first absorber layer |
| 920 | anti-reflective layer |

DETAILED DESCRIPTION

Figure 1:
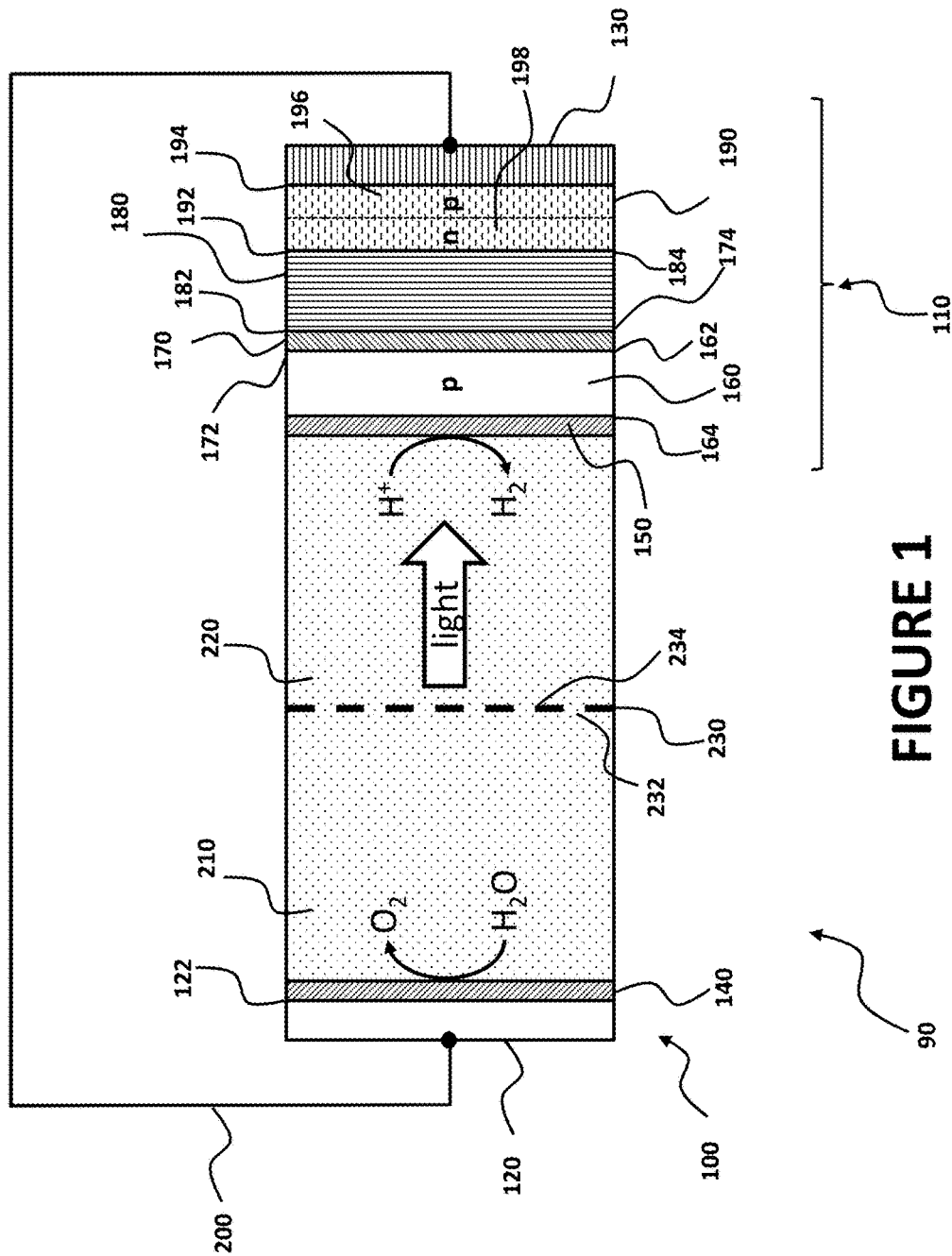
FIG. 1 illustrates a photoelectrochemical device for capturing solar energy and utilizing the energy captured for electrolysis to produce $H_2$ and $O_2$ (or water splitting), according to some embodiments of the disclosure.

Some embodiments of the disclosure described herein provide tandem photoelectrochemical devices with very high water-splitting efficiencies, such as up to about 16%. For example, FIG. 1 illustrates a photoelectrochemical device 90 for capturing solar energy and utilizing the captured energy for electrolysis to produce diatomic hydrogen and diatomic oxygen. The photoelectrochemical device 90 may include a first electrode 110, which may include a first absorber layer 160, such as a p-type absorber layer. The first absorber layer 160 may be constructed using an AlGaInAsP alloy containing a p-type material but lacking an n-type material. The first absorber layer 110 may have a relatively high bandgap (relative to the second absorber layer) between about 1.5 eV and about 1.9 eV. In some embodiments, the first absorber layer 160 may have a bandgap between about 1.6 eV and about 1.8 eV. The first absorber layer 160 may also have a first surface 164 and a second surface 162. The first absorber layer 110 may have a p-type conductivity due to doping of the AlGaInAsP alloy with one or more dopants such as zinc, beryllium, magnesium, and/or carbon.

The AlGaInAsP alloy used for the first absorber layer 160 may be described as having a first mixture of Group III elements combined with a second mixture of Group V elements. Group III elements include boron, aluminum, gallium, indium, and thallium. Group V elements include nitrogen, phosphorus, arsenic, antimony, and bismuth. Thus, the elemental stoichiometry of the AlGaInAsP alloy used for the first absorber layer 160 may be described as, $$Al_xGa_yIn_zAs_vP_w,$$

where x is between 0.0 and 1.0, y is between 0.0 and 1.0, z is between 0.0 and 1.0, v is between 0.0 and 1.0, w is between 0.0 and 1.0, and x+y+z=v+w=1.0. In some embodiments of the present disclosure, x=v=about 0.0, resulting in an alloy for the first absorber layer 160 that may be described as, $$Ga_yIn_zP.$$

In some embodiments of the present disclosure, the first absorber layer 160 may be constructed from an alloy defined as $Ga_yIn_zP_w$ where y is between about 0.4 and about 0.6, z is between about 0.4 and about 0.6, y+z=1.0, and w=1.0. In some embodiments of the present invention, y may equal about 0.5. For example, a first electrode may have a first absorber layer with a composition of about $Ga_{0.5}In_{0.5}P$ with a bandgap of about 1.8 eV. In some embodiments of the present invention, the first electrode may have a first absorber layer having a composition of $Ga_xIn_{1-x}As_tP_{1-t}$, where x is about 0.68, t is about 0.34, and a bandgap of about 1.7 eV.

The first electrode 110 may also include a tunnel junction layer 170 with a first surface 172 and a second surface 174, where the first surface 172 of the tunnel junction layer 170 may be configured to be in direct physical contact with the second surface 164 of the first absorber layer 160. The first electrode 110 may also include a graded buffer layer 180, characterized by a first surface 182 and a second surface 184, where the graded buffer layer 180 may be constructed from a plurality of films (represented as a series of parallel vertical lines in FIG. 1) stacked between and including the first surface 182 and the second surface 184 of the graded buffer layer 180. Each film of the graded buffer layer 180 may be from an alloy having two or more of Al, Ga, In, As, and/or P. For example, a graded buffer layer 180 may have a composition described as, $$Al_aGa_bIn_cAs_dP_e,$$

where a is between 0.0 and 1.0, b is between 0.0 and 1.0, c is between 0.0 and 1.0, d is between 0.0 and 1.0, e is between 0.0 and 1.0, and a+b+c=d+e=1.0. For example, in some embodiments, a=d=0, such that a graded buffer layer 180 may include a $Ga_bIn_cP$ alloy, where e=1 and b+c=1.0. In some embodiments of the present disclosure, the material selected for each individual layer of a graded buffer layer 180 may be different than the materials used to construct the other layers of the graded buffer layer 180. The first surface 182 of the graded buffer layer 180 may be in direct contact with the second surface 174 of the tunnel junction layer 170.

The first electrode 110 may also include a second absorber layer 190, for example a p-n type second absorber layer. In some embodiments, the second absorber layer 190 may include a GaInAs absorber layer. Other examples include GaAsSb, AlGaAsSb, AlGaInAs, AlGaInAsSb, or any other suitable alloys that provide the desired bandgap. The GaInAs alloy used for the second absorber layer 190 may be described as having a first mixture of Group III elements combined with a second mixture of Group V elements. Thus, the elemental stoichiometry of the GaInAs alloy used for the second absorber layer 190 may be described as, $$Ga_uIn_tAs,$$

where u is between 0.0 and 1.0, t is between 0.0 and 1.0, and t+u=1.0. In some embodiments of the present disclosure, t may be between about 0.15 to about 0.35. In some embodiments of the present disclosure, t may be about 0.15.

The second absorber layer 190 may have a first surface 192 and a second surface 194, where a p-type layer 196 may be configured to be in direct physical contact with an n-type layer 198. The n-type layer 198 may form the first surface 192 of the second absorber layer 190 and may be in direct contact with the second surface 184 of the graded buffer layer 180, and the p-type layer 196 may form the second layer 194 of the second absorber layer 190. In some embodiments of the present disclosure, the second absorber layer 190 may have a bandgap between about 0.75 eV to about 1.5 eV. In some embodiments of the present disclosure, the second absorber layer 190 may have a bandgap between about 0.9 eV to about 1.2 eV. The first electrode 110 may also include an Ohmic contact layer 130 in direct physical contact with the second surface 194 of the second absorber layer 190. For example, a first electrode 110 may have a second absorber layer 190 constructed with an alloy such as $Ga_{1-z}In_zAs$ where z is between about 0.15 to about 0.35.

In some embodiments of the present disclosure, the photoelectrochemical device 90 may also include a second electrode 100 with an Ohmic contact layer 120 with a first surface 122. The Ohmic contact 120 of the second electrode 100 may also be electrically connected to the Ohmic contact layer 130 of the first electrode 110 by an electrical connection 200. In some embodiments of the present disclosure, the photoelectrochemical device 90 may also include an aqueous electrolyte (210 and 220) positioned between and in direct physical contact with both the first surface 164 of first absorber layer 160 of the first electrode 110 and the first surface 122 of the second electrode 120.

In some embodiments of the present disclosure, the photoelectrochemical device 90 may also include a porous membrane 230 (or other porous separator) with a first surface 232 and a second surface 234. The porous membrane 234 may be positioned in the electrolyte 210 and 220 between the first surface 164 of the first absorber layer 160 of the first electrode 110 and the first surface 122 of the second electrode 120. The porous membrane 230 may be configured to divide the electrolyte 210 and 220 into a first portion of electrolyte 220 positioned between the first surface 164 of the first absorber layer 160 of the first electrode 110 and the first surface 234 of the membrane 230, and a second portion of electrolyte 210 positioned between the first surface 122 of the second electrode and the second surface 232 of the membrane 230. In some embodiments of the present disclosure, the aqueous electrolyte 210 and 220 may be aqueous sulfuric acid.

Referring again to FIG. 1, in some embodiments of the present disclosure, the first surface 164 of the first absorber layer 160 of the first electrode 110 may include a catalyst 150 for catalyzing electrolytic conversion of hydronium ions to diatomic hydrogen. In some embodiments of the present disclosure, the first surface 122 of the Ohmic contact 120 of the second electrode 100 may include a catalyst 140 for catalyzing the electrolytic degradation of water to produce diatomic oxygen. Finally, in the example shown in FIG. 1, the first surface 164 of the first absorber layer 160 of the first electrode 110 may be oriented such that it faces the incoming light.

Figure 2:
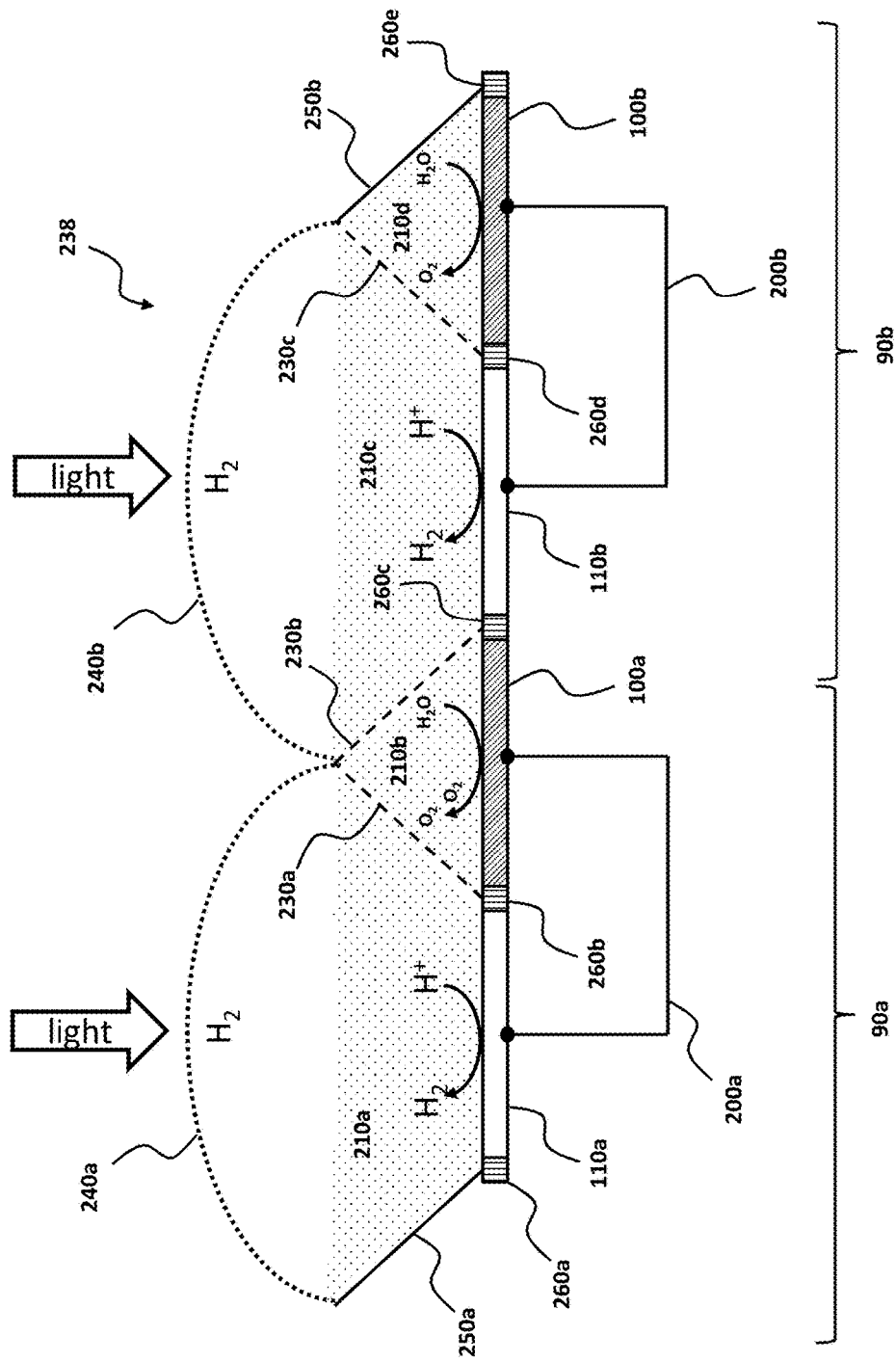
FIG. 2 shows a photoelectrochemical system, constructed from multiple PEC devices in parallel, for capturing solar energy and utilizing the energy captured for electrolysis to produce $H_2$ and $O_2$ (or water splitting), according to some embodiments of the disclosure.

FIG. 2 illustrates another example of the present disclosure, a system 238 for the photoelectrochemical conversion of water to hydrogen gas and oxygen gas. The system 238 may be constructed from at least one photoelectrochemical device 90 as described above and illustrated in FIG. 1. In this example, the system 238 has two photoelectrochemical devices (90a and 90b). Each photoelectrochemical device (90a and 90b) may include a first electrode (110a and 110b) and a second electrode (100a and 100b) as previously described, and each first electrode (110a and 110b) and second electrode (100a and 100b) may be configured to be electrically connected, for example by utilizing an electrical connection (200a and 200b). In the example illustrated in FIG. 2, the first surfaces, in this case, the top surfaces of both the first electrodes (110a and 110b) and the second electrodes (100a and 100b) for both photoelectrochemical devices (90a and 90b) are upward facing, directed towards the incoming light (e.g. sunlight).

Cup- or trough-shaped reservoirs may be formed by a combination of barrier walls (250a and 250b) and porous membranes 230a-c. The reservoirs may be capped with windows (240a and 240b) to create a first empty volume positioned above each first electrode (110a and 110b) and a second empty volume positioned above each second electrode (100a and 100b). Portions of each empty volume may then be filled with electrolyte 210a-d. The windows (240a and 240b) may be configured with a transparent material that concentrates the light passing through the window such that the light striking the first electrode (110a and 110b) may be concentrated to equal the radiant intensity of one or more suns.

In some embodiments of the present disclosure, the system 238 may be configured such that the hydrogen gas generated by each first electrode (110a and 110b) gravimetrically separates from the electrolyte (210a and 210b) positioned above and in contact with the first electrode (110a and 110b), such that the hydrogen gas may collect in an empty space above the electrolyte (210a and 210b). Similarly, the system 238 may be configured such that the oxygen gas generated by each second electrode (100a and 100b) gravimetrically separates from the electrolyte (210c and 210d) positioned above and in contact with each second electrode (100a and 100b), such that the oxygen gas collects in an empty space above the electrolyte (210c and 210d). An insulator 260a-e may be positioned between the first electrodes (110a and 110b) and adjoining and/or adjacent second electrodes (100a and 100b) to prevent them from short-circuiting.

In some embodiments of the present disclosure, the device for capturing the energy from electromagnetic radiation may include a water source configured to provide makeup water to the aqueous electrolyte, to replenish the water that is removed from the system by the reaction of water to produce diatomic hydrogen and diatomic oxygen. In some embodiments, the device may also include a hydrogen gas recovery system configured to remove hydrogen gas from the aqueous electrolyte, and/or an oxygen gas recovery system configured to remove oxygen gas from the aqueous electrolyte. The device for capturing energy from electromagnetic radiation may also be operated at pressure higher than atmospheric pressure (e.g. greater than 14.7 psia). In some embodiments of the present disclosure, the device may be operated at pressures up to about 1000 psia. In some embodiments, the device may be operated at pressures up to about 300 psia.

In some embodiments of the present disclosure, a tandem monolithic photoelectrochemical device for water-splitting may be constructed using a first absorber layer and a second absorber layer, where each absorber layer is fabricated using one or more semiconductor materials. In some cases, the one or more semiconductor materials may be selected from III-V elements including boron, aluminum, gallium, indium, thallium, nitrogen, phosphorus, arsenic, antimony, and/or bismuth. Some examples of III-V compounds and alloys that may be used to construct the first absorber layer and/or the second absorber layer include AlP, GaP, InP, AlAs, GaAs, InAs, AlSb, InSb, BN, BAs, AlN, AlP, AlAs, GaN, GaP, GaSb, InN, InSb, GaInP, GaInAs, AlInAs, AlInSb, GaAsN, GaAsP, GaAsSb, AlGaN, AlGaP, InGaN, AlGaP, InGaN, InAsSb, InGaSb, GaInAsP, AlGaInP, AlGaAsP InGaAsP, InGaAsSb, InAsSbP, AlInAsP, AlGaAsN, InGaAsN, InAlAsN, GaAsSbN GaInNAsSb, and/or GaInAsSbP. The stoichiometric values of any particular semiconductor may be varied as needed to attain the desired physical property and/or performance values. For example, it is to be understood that GaInP may include any stoichiometric composition defined by $Ga_xIn_{1-x}P$ where x is as follows: $0 \leq x \leq 1$. Different values of the composition x result in different bandgaps. The same definition applies to any of the other possible semiconductor alloys.

Both the first absorber layer and the second absorber layer may be undoped, a p-type doped material, an n-type doped material, or combinations thereof. In some cases, either the first absorber layer and/or the second absorber layer may include both a p-type layer and an n-type layer to form a p-n junction within the respective absorber layer. p-type and n-type layers within an absorber layer may be obtained by doping the semiconductor materials using the appropriate dopants. In some case, the first absorber layer and/or the second absorber layer may be constructed of two or more distinctly doped layers; e.g. a first p-type layer, a second n-type layer, and a third p-type layer. In some cases, the p-type and n-type layers may have different semiconductor compositions, forming a type of junction known as a heterojunction. In some embodiments of the present disclosure, a dopant for a III-V semiconductor alloy may include at least one of a group VI and/or a group IV element and/or a group II element. Examples of group VI elements include sulfur, selenium, and tellurium. Examples of group IV elements include carbon, silicon, germanium, and tin. Examples of Group II elements include beryllium, magnesium, and zinc. In some embodiments, a first electrode may include p-type and/or n-type absorber layers constructed of alloys such as n-GaInP (bandgap of about 1.8 eV), p-AlGaAs (1.7 eV), n-GaInAsP (1.7 eV), and/or p-AlGaAs (1.7 eV).

FIG. 1 illustrates an example where the first electrode 110 behaves as a photocathode and the second electrode 100 behaves as a photoanode. The opposite polarity can be achieved by inverting the doping of the various layers shown in FIG. 1. For example, by n-doping the first absorber layer 160 to make an n-type top junction and/or reversing the doping of layers 196 and 198 such that layer 196 is n-type and layer 198 is p-type, the first electrode 110 may behave as photoanode, and the second electrode 100 may behave as a photocathode. This example may be desirable for operation with a base electrolyte.

The materials chosen for fabricating the first absorber layer and the second absorber layer are selected to provide a combination of bandgaps that maximize the photoelectrochemical device's STH efficiency and to provide the voltage necessary split water into hydrogen and oxygen. In some cases, the first absorber layer may have a bandgap ranging from about 1.5 eV to 1.9 eV. In some further cases, the first absorber layer may have a bandgap ranging from about 1.6 eV to 1.8 eV. In some cases, the second absorber layer may have a bandgap ranging from about 0.75 eV to 1.5 eV. In some further cases, the second absorber layer may have a bandgap ranging from about 0.9 eV to 1.2 eV. Still further examples include top absorber layer/bottom absorber layer bandgap combinations of about 1.8 eV to about 1.2 eV, and/or 1.7 eV to about 0.95 eV. In still further examples, photoelectrochemical devices may include tandem devices where each of at least two absorber layers have approximately the same bandgaps; e.g. GaAs/GaAs and/or InP/InP.

In some embodiments of the present disclosure, the photoelectrochemical device for water splitting may provide a voltage from about 0.5 V to about 5 V. In some embodiments, the photoelectrochemical device for water splitting may provide from about 1.23 V to about 2.5 V. In some embodiments, the voltage provided by the photoelectrochemical device may be supplemented by a voltage provide by some other additional device. Layer and/or film thicknesses for some embodiments of the present disclosure, may range from about 0.1 microns to about 10 microns. Alternatively layers and/or films may range from about 1 micron to about 10 microns in thickness. A first absorber layer may have a thickness between about 0.5 microns and about 3 microns. A second absorber layer may have a thickness between about 1 micron and about 3 microns.

In some embodiments of the present disclosure, a tunnel junction may be provided between the first absorber layer and the second absorber layer (reference numeral 170 in FIG. 1). A tunnel junction may serve as a non-rectifying Ohmic contact between the first absorber layer and the second absorber layer. In some embodiments of the present disclosure, a tunnel junction may be selected from a semiconductor alloy that is identical to or very similar to the semiconductor alloy selected for the first absorber layer to provide a tunnel junction that is lattice-matched to the first absorber layer. In some cases, a tunnel junction may not contain a p-type layer or an n-type layer or any other non-ohmic forming materials. Examples of non-doped semiconductor layers that may be used as tunnel junctions between the first absorber layer and the second absorber layer include AlP, GaP, InP, AlAs, GaAs, InAs, AlSb, InSb, BN, BAs, AlN, AlP, AlAs, GaN, GaP, GaSb, InN, InSb, GaInP, GaInAs, AlInAs, AlInSb, GaAsN, GaAsP, GaAsSb, AlGaN, AlGaP, InGaN, AlGaP, InGaN, InAsSb, InGaSb, GaInAsP, AlGaInP, AlGaAsP, InGaAsP, InGaAsSb, InAsSbP, AlInAsP, AlGaAsN, InGaAsN, InAlAsN, GaAsSbN, GaInNAsSb, and/or GaInAsSbP.

In some embodiments of the present disclosure, the photoelectrochemical device for collecting electromagnetic energy and utilizing the collected energy for water splitting may include a graded buffer layer between the first absorber layer and the second absorber layer (reference number 180 in FIG. 1). A graded buffer layer may be included to mitigate the effects of lattice mismatching between the first absorber layer and the second absorber layer. Effects which are mitigated by the graded buffer layer include interface defects and interface recombination. Preferably, a graded buffer layer may be selected that minimizes light absorption by the buffer layer itself. In some embodiments, the photoelectrochemical device may include a GaInAsP first absorber layer, a GaInAs second absorber layer, and a graded buffer layer between. A graded buffer layer may include a plurality of stacked and adjacent films (total number of films equal to N) in direct contact with one another, where a first or top layer (n=1) is in direct physical contact with either the first absorber layer or the tunnel junction, and the last or bottom layer (n=N) is in direct physical contact with the second absorber layer.

A graded buffer layer may include a series of stacked buffer films constructed from at least one of the elements B, Al, Ga, In, and/or Tl, and/or at least one of the elements N, P, As, Sb, and/or Bi. Some examples include AlGaInAs, AlGaInP, GaInAsP, and GaInP. For example, the graded buffer layer may include a first film constructed from a GaInAlP alloy having a lattice constant that is similar or equal to the lattice constant of the tunnel junction or first absorber layer, positioned in direct contact with the tunnel junction or first absorber layer. In some embodiments of the present disclosure, the degree of lattice mismatching between adjacent layers or films may be less than 10%. In some embodiments of the present disclosure, the degree of lattice mismatching between adjacent layers or films may be less than 1%. In some embodiments, the number of buffer films contained in a graded buffer layer may range from 3 to 20 films.

Referring again to FIG. 1, the first electrode 110 of the photoelectrochemical device 90 may include an Ohmic contact 130 for collecting the charges generated by the first absorber layer 160 and second absorber layer 190. The first electrode may be electrically connected to a second electrode by an electrical connection (reference numbers 100 and 200 respectively) to facilitate transferring the charges generated by the first electrode to the second electrode. The Ohmic contact 130 of the first electrode 110, the Ohmic contact 120 of the second electrode 100, and/or the electrical connection 200 may be constructed from any suitable material of construction, for example copper, stainless steel, titanium, silver, gold, platinum, palladium, and/or aluminum.

In some embodiments of the present disclosure, the first absorber layer 160 of the first electrode 110 may contain in its bulk and/or on its surface a catalyst 150 that may catalyze the conversion of hydronium ions to diatomic hydrogen. In some embodiments of the present disclosure, the second electrode 100 may contain in its bulk and/or on its surface a catalyst 140 that may catalyze the conversion of water to diatomic oxygen. Catalysts for one or both of the electrodes of the present disclosure include, include at least one of molybdenum sulfide, graphene quantum dots, carbon nanotubes, perovskites, nickel/nickel-oxides, $NaTaO_3$:La, $K_3Ta_3B_2O_{12}$, GaZnNO alloys, Pt, $TiO_2$, cobalt, bismuth, ruthenium, $RuO_2$, and/or $IrO_x$. Some embodiments may also include surface attached homogeneous catalysts and interface modifiers.

In some embodiments of the present disclosure, a volume between a surface of the first absorber layer 160 of the first electrode 110 and a surface of the second electrode 100 may be substantially filled with an aqueous electrolyte (210 and 220). In some cases, the aqueous electrolyte may be acidic, basic, or neutral. The aqueous electrolyte may be characterized by a pH ranging from greater than about 0 to about 14. In other embodiments, the aqueous electrolyte may be characterized by a pH ranging from greater than about −0.5 to about 7. The aqueous electrolyte may be an acid solution containing, for example, a strong acid such as HI, HBr, $HClO_4$, $HClO_3$, $H_2SO_4$, and/or $HNO_3$. In some embodiments, the electrolyte may include a weak acid such as $CH_3COOH$ (acetic acid), HCOOH (formic acid), HF, HCN (hydrocyanic acid), and/or $HNO_2$ (nitrous acid). Aqueous electrolytes may also include basic solutions that include, for example, KOH and/or NaOH solutions. Any other suitable acidic or basic solutions may be used.

A photoelectrochemical device 90 may also include a porous membrane 230 that may separate the electrolyte into two portions (210 and 220), such that ions may be transported from one side of the membrane 230 and one portion of the electrolyte to the other side of the membrane and other portion of the electrolyte, while simultaneously preventing the reaction products ($H_2$ and $O_2$) from contacting each other. Examples of porous membranes include fluorinated polymers (e.g. Nafion®, Flemion®, Teflon®, and Aciplex®), polyether-ether ketone (e.g. SPEEK®), poly(phenylquinoxalene) polymers, and/or copolymers thereof. Anion exchange membranes may also be used, for example, with basic electrolytes. Methods of making one or more of the films and/or layers of the devices described herein may include metal organic chemical vapor deposition (MOCVD), metal organic vapor phase epitaxy (MOVPE), molecular beam epitaxy (MBE), hydride vapor phase epitaxy (HVPE), chemical vapor deposition methods (CVD), liquid phase epitaxy (LPE), and/or other suitable methods.

In some embodiments of the present disclosure, a photoelectrochemical device may be optimized such that the electrolyte and the bandgaps of the absorbing layers of the photoelectrochemical device provide a maximum STH. For example, FIG. 3 illustrates a response surface for STH efficiencies derived from a detailed balance modeling approach. FIG. 3 shows that a maximum STH of about 22.8% can be obtained for a first absorber layer (top) having $GaInP_2$ with a bandgap of about 1.8 eV in conjunction with a second absorber layer (bottom) including GaAs with a bandgap of about 1.2 eV, also with an aqueous electrolyte layer with a thickness of between about 1 mm to about 3 cm, and an overvoltage of 1050 mV. In some embodiments of the present disclosure, the overvoltage may be between about 0 and about 2000 mV. In some embodiments of the present disclosure, the overvoltage may be between about 300 mV and about 1200 mV. FIG. 4 illustrates results for unassisted water splitting with an STH efficiency of about 15%.

Although only a few embodiments of this disclosure have been described in detail above, those skilled in the art will readily appreciate that many modifications are possible in to the examples provided herein without materially departing from the novel teachings and advantages of this disclosure. The disclosure now being generally described will be more readily understood by reference to the following examples, which are included merely for the purposes of illustration of certain aspects of the embodiments of the present disclosure. The examples are not intended to limit the disclosure, as one of skill in the art would recognize from the above teachings and the following examples that other techniques and methods can satisfy the claims and can be employed without departing from the scope of the claimed disclosure.

EXAMPLE 1

Referring to FIG. 5, this example describes an embodiment of the present disclosure where a higher bandgap first absorber layer 160 is lattice-matched to GaAs. This is combined with a lower bandgap, second absorber layer 190, which is not lattice-matched to GaAs. The two absorber layers are united together utilizing a graded buffer layer 180 and a tunnel junction 170.

Specifically, FIG. 5 describes a tandem, photoelectrochemical device architecture to achieve optimal bandgap absorber layers (for both the first absorber layer 160 and the second absorber layer 190) for high efficiency water-splitting, with extremely high photovoltaic quality for both absorber layers. The first absorber layer 160 has a relatively high bandgap of about 1.8 eV due to an alloy composition of about $Ga_{0.5}In_{0.5}P$. In general, the first absorber layer 160 may be constructed of any III-V semiconductor composition that includes Al, Ga, In, P, and/or As, such that the composition provides a bandgap between about 1.4 eV and about 1.8 eV. The second absorber layer 190 has a relatively low bandgap of about 1.2 eV due to an alloy composition of about $Ga_{0.85}In_{0.15}As$. In general, the second absorber layer 190 may be constructed of any III-V semiconductor composition that includes Al, Ga, In, P, As, and/or Sb, such that the composition provides a bandgap between about 0.9 eV and about 1.3 eV.

The architecture of the first electrode 110 shown in FIG. 5 is an inverted metamorphic multi junction structure, in which the high-bandgap first absorber layer 160 is lattice-matched to the GaAs substrate 520, where the first absorber layer 160 is grown first; the lower-bandgap second absorber layer 190, which may not be grown lattice-matched to GaAs may then be grown subsequently, with the strain induced by the lattice mismatch mitigated by a carefully-engineered lattice-constant-graded transparent buffer layer 180 interposed between the first absorber layer 160 and the second absorber layer 190. In this example, the alloy of the buffer layer 180 has a composition that includes one or more of aluminum, gallium, indium, and/or phosphorus, such that the composition provides a buffer layer 180 that provides the lattice constant grading necessary to overcome lattice strain between the first absorber layer 160 and the second absorber layer 190, while also providing a bandgap that is sufficiently transparent to avoid undesirable light absorption by the buffer layer 180.

For example, a contact layer 130 may be constructed using zinc-doped (p-type) GaInAs (with a bandgap of about 1.2 eV) with a thickness between about 50 nm and about 200 nm. A first back surface field layer 500 may include zinc-doped (p-type) GaInP (with a bandgap of about 1.7 eV) at a thickness between about 100 nm and 500 nm. A tunnel junction 170 may be constructed of at least one of selenium- and/or silicon-doped AlGaAs, selenium-doped GaAs, and/or carbon-doped AlGaAs, having a nominal thickness between about 10 nm and about 200 nm. A second back surface field layer 510 may include zinc-doped $Al_{0.27}Ga_{0.26}In_{0.47}P$ (with a bandgap of about 2.2 eV) and a thickness between about 100 nm and about 300 nm. A substrate 520 may include silicon-doped GaAs.

The device of FIG. 5 is an "inverted" configuration, in which the substrate upon which the semiconductor layers of the device are grown is removed to allow sunlight to enter the cell. The manufacturing process to remove the substrate usually includes the following. First, the semiconductor layers are epitaxially grown upon the substrate in a semiconductor growth system. Second, the substrate and the semiconductor layers are removed as a single item from the reactor. At this point, the last-grown layer is the back side of the device, while the first-grown layer, which is in contact with the substrate, will eventually become the front side of the device which will face the sun. A planar metal contact is applied by evaporation and/or electroplating the contact onto the back side of the device. The back side of the device is bonded to a "handle", which may be constructed of a piece of material such as silicon, a metal, a ceramic, or a glass. The handle provides mechanical strength once the substrate is removed. The substrate is then removed by one of several possible techniques: the substrate may be etched away, or it may be removed nondestructively to enable its reuse.

Referring again to FIG. 5, the basic elements of the device structure may include from top to bottom:
1. an Ohmic layer 130;
2. a first back surface field layer 500, which provides passivation for the back surface of second absorber layer 190, which may be about 0.3 micron thick $Ga_{0.36}In_{0.64}P$, doped p-type;
3. a low bandgap second absorber layer 190;
4. a graded buffer layer 180;
5. a tunnel junction 170;
6. a second back surface field layer 510, which provides passivation for the back surface of first absorber layer 160, which may be about 0.2 micron thick $Al_{0.27}Ga_{0.26}In_{0.47}P$, doped heavily p-type;
7. a high bandgap first absorber layer 160; and
8. a substrate 520. The substrate may be GaAs with an orientation close to (100), but may also be Ge (germanium). Typical substrate thicknesses range from 200 microns to 600 microns.

A general specification of the embodiment described in Example 1 is summarized in Table 1 below with a more specific example provide in Table 2:

EXAMPLE 2

Example 2 describes another example of the present disclosure, where a higher bandgap first absorber layer is not be lattice-matched to GaAs and a lower bandgap second absorber layer is not latticed-matched to GaAs.

The specific optimum band gap combinations for PEC operation depend on the electrolyte film thickness through which the device will be illuminated. A general strategy may be to maximize the total current while providing a threshold voltage for water splitting (potentially including an overvoltage). In some cases, bandgaps may be decreased, such that both absorber layers may produce equal current under water splitting conditions. Top cell thinning and luminescent coupling may further increase the flexibility in device design by balancing the photocurrents between the first absorber and the second absorber.

In addition to decreasing the first absorber layer band gap by composition only (e.g. GaInPAs composition lattice matched to GaAs), it may also be an option to change the lattice constant by a first graded buffer layer, which may be removed during inverted device processing. Some examples include GaInP compositions with a lattice constant greater than that of GaAs and a band gap below 1.8 eV (See Example No. 1 in Table 3 below). In other cases, a change of the lattice constant of the first absorber layer may suffice to integrate an optimum second absorber layer on the same lattice constant (in particular when considering top cell thinning). In these cases, the graded buffer layer between both absorber layers may be omitted (See Example No. 2 in Table 3 below). In addition, without a need for an intermediate graded buffer layer, upright growth and processing of very similar structures may be potentially advantageous (See Example No. 3 in Table 3 below).

In principle, metamorphic tandem PEC devices may be grown on different substrates. One example includes the integration of a first absorber layer material with a band gap of about 1.7 eV on silicon. This may be achieved with a GaAsP-based graded buffer layer to a GaAsP with a desired and direct bandgap (See Example No. 4 in Table 3 below). Other material compositions and substrates, for example InP, may be included as well.

TABLE 1

Specification of the device structure - General

| Element of the device structure | Bandgap | Composition | Lattice Constant $a_0$ |
|---|---|---|---|
| 1$^{st}$ absorber layer | Eg1 = 1.4-1.8 eV | (Al, Ga, In)(As, P) | $a_01$ = 5.65 Å (Same as GaAs) |
| Graded buffer layer | Greater than Eg1 (for transparency) | (Al, Ga, In)(As, P, Sb) | Varies across the buffer, from $a_01$ to $a_03$ |
| 2$^{nd}$ absorber layer | 0.9-1.2 eV | (Al, Ga, In)(As, P, Sb) | $a_03$, which is greater than $a_01$ |

TABLE 2

Specification of the device structure - Specific Example

| Element of the device structure | Bandgap | Composition | Lattice Constant |
|---|---|---|---|
| 1$^{st}$ absorber layer | Eg1 = 1.8 eV | $Ga_{0.51}In_{0.49}P$ | $a_01$ = 5.65 Å (Same as GaAs) |
| Graded buffer layer | Greater than 1.8 eV (for transparency) | Varies from $Ga_{0.51}In_{0.49}P$ to $Ga_{0.19}In_{0.63}Al_{0.18}P$ | Varies across the buffer, from $a_01$ to $a_03$ |
| 2$^{nd}$ absorber layer | 1.2 eV | $Ga_{0.85}In_{0.15}As$ | $a_03$ = 5.71 Å |

TABLE 3

Other Tandem/Buffer Layer Options

| No. | Substr. | Graded Buffer Layer 1 | 1$^{st}$ Absorber Layer | Bandgap 1 | Graded Buffer Layer 2 | 2$^{nd}$ Absorber Layer | Bandgap 2 | growth |
|---|---|---|---|---|---|---|---|---|
| 1 | GaAs | removable | GaInP | <1.8 eV | transparent | GaInAs | <1.3 eV | inverted |
| 2 | GaAs | removable | GaInP | <1.6 eV | none | GaInAs | <1.3 eV lattice matched to 1$^{st}$ absorber layer | inverted |
| 3 | GaAs | buried | GaInAs | <1.4 eV | none | GaInP | lattice matched to 1$^{st}$ absorber layer | upright |
| 4 | Si | none | Si (active) | 1.12 eV | transparent | GaAsP | about 1.7 eV | upright |

EXAMPLE 3

Example 3 provides further examples of potential buffer layer and active layer combinations. Referring to part (A) of FIG. 6, a half-cell current-voltage (I-V) performance of a standard inverted (first absorber layer|second absorber layer, eV 1.8|1.4 eV, GaInP$_2$|GaAs) tandem photoelectrode is shown (filled/solid markers). This is compared to an inverted metamorphic (IMM) device with 1.8|1.2 eV, GaInP$_2$|InGaAs tandem photoelectrode. The voltage onset of the IMM device is ~0.2 V less than the standard inverted device because the bottom band gap is 0.2 eV lower. Lowering the bandgap (and thus voltage) enables the second absorber layer to absorb more light and increase its output current at the water splitting potential.

Referring to part (B) of FIG. 6, a full cell (filled/solid markers refers to using both a first electrode and a second electrode; e.g. corresponding to a photocathode and a Pt black anode) I-V performance is shown for a (first absorber layer|second absorber layer, 1.8|1.4 eV, GaInP2|GaAs) tandem photoelectrode. The I-V data is taken with a bias versus a Pt black anode meaning that spontaneous, unbiased water splitting occurs at 0 V vs. Pt Black (short-circuit). A current of 9.4 mA/cm$^2$ is multiplied by ~1.23 V to estimate a solar-to-hydrogen (STH) efficiency of 11.6%. Modeling results are shown for a first absorber layer|second absorber layer, 1.8|1.2 eV, GaInP$_2$|InGaAs tandem photoelectrode (red data) that shows a 0.2 V lower onset potential. The short-circuit current was estimated by integrating the spectral response over the solar spectrum as shown on the next slide.

Referring to part (A) of FIG. 7, the colored data show the incident photon-to-current efficiency (IPCE) of different junctions. All devices have a GaInP$_2$ (1.8 eV bandgap) first absorber layer and either a GaAs (1.4 eV) or InGaAs (1.2 eV) second absorber layer. The first GaInP$_2$ absorber layer absorbs wavelengths shorter than ~680 nm while the second GaAs absorber layer absorbs ~680-880 nm and InGaAs 680-1050 nm. The IPCE data is integrated over the direct solar spectrum (light gray dotted line) to estimate the current from each absorber layer as shown in the right figure. The current expected from each absorber layer is read where each of the colored curves in the right figure intercepts the vertical axis (black arrows). Because these tandem devices operate in series, the current of each device is limited by the lower current of the two junctions (e.g. absorber layers). In the case of the GaInP$_2$|GaAs tandem, the current is limited to ~10 mA/cm$^2$ by the GaAs absorber layer (green line). The InGaAs absorber layer (allowed by the IMM growth) achieves ~15 mA/cm$^2$ (orange line). The GaInP$_2$|InGaAs tandem is limited by the GaInP$_2$ absorber layer to ~12.5 mA/cm$^2$ (blue line). This ~12.5 mA/cm$^2$ is used to estimate the short-circuit current of the IMM prophetic shown on the previous slide.

EXAMPLE 4

FIG. 8 illustrates the photocurrent density-potential (J-V) of three first electrodes having p-n-GaInP$_2$ first absorber layers, compared to a first electrode having a p-GaInP$_2$ first absorber layer. These data were taken on non-tandem electrode configurations in order to isolate the effects of a first absorber layer having only a p-layer (as shown in FIG. 1) versus a first absorber layer having an n-layer deposited onto the p-layer (as shown in FIG. 9).

These experiments were completed in electrolyte solutions of 3M H$_2$SO$_4$ under simulated AM 1.5 G illumination against a mercury/mercury sulfate (MSE) reference electrode. The data points that run along the x-axis on the top of the FIG. 8 correspond to light-blockage during the J-V experiments. FIG. 8 illustrates that the incorporation of a thin, highly n-doped layer on top of a first absorber layer constructed of p-GaInP$_2$ moves the photocurrent onset potential to more positive potentials as indicated by the arrow. As a result, the obtainable open-circuit voltage is increased for the higher bandgap first absorber layer, which improves the overall performance of the first electrode.

FIG. 9 illustrates an inverted metamorphic first electrode 110 having a first absorber layer 160, where the first absorber layer 160 includes a p-type layer 900 with an n-type layer 910 deposited on the p-type layer 900. In this example, the first electrode 110 also includes a second absorber layer 190 having a p-type layer 196 and an n-type layer 198. A tunnel junction 170 is positioned in contact with the p-type layer 900 of the first absorber layer 160 and a graded buffer layer 180 is positioned between the tunnel junction 170 and the n-type layer 198 of the second absorber layer 190. An n-type layer, either the n-type layer 910 of the first absorber layer 160 and/or the n-type layer 198 of the second absorber layer 190 may be provided by including at least one dopant in the alloy used to construct the n-type layer. Suitable n-type dopants include at least one of selenium, silicon, tellurium, sulfur, and/or germanium. A p-type layer, either the p-type layer 900 of the first absorber layer 160 and/or the p-type layer 196 of the second absorber layer 190 may be provided by including at least one dopant in the alloy used to construct the p-type layer. Suitable p-type dopants include at least one of zinc, beryllium, magnesium, and/or carbon. Dopant concentrations may be between about $10^{19}/cm^3$ and about $10^{20}/cm^3$ range for the tunnel junction layers, and between about $10^{15}/cm^3$ and about $10^{18}/cm^3$ range for the other layers (e.g. absorber layers, buffer layers, etc.).

In addition, a catalyst layer (not shown) may be positioned on the outer surface of the n-type layer 910 of the first absorber layer 160 to improve hydrogen gas production. FIG. 9 also illustrates an anti-reflective layer 920 positioned on the outer surface of first absorber layer 160, in this case on the outer surface of n-type layer 910. In other cases, like the Example of FIG. 1, an anti-reflective layer may be applied to the surface of what ever layer makes up the light-receiving surface of the device; e.g. a catalyst layer, an n-type layer of an absorber layer, a p-type-layer of an absorber layer, etc. In some embodiments, an anti-reflective layer may be constructed of $TiO_2$. An Ohmic contact 130 is also positioned against the outer surface of the p-type layer 196 of the second absorber 190. The Ohmic contact 130 may also serve the purpose of a back reflector by constructing the Ohmic contact 130 with a reflective material such as a reflective metal; e.g. gold, silver, etc.

FIG. 10 illustrates performance data of several device configurations, specifically the efficiencies of the devices tested at short circuit (0 V vs. IrOx) under simulated AM1.5G illumination in 3M $H_2SO_4$ biased against an iridium oxide (IrOx) anode. The back reflector of an inverted structure allows greater capture of photons with energies near the bandgap energy of the second absorber layer, GaAs, which augments current density with little effect on the voltage. The IMM cell incorporates a 1.2 eV InGaAs second absorber layer, which is able to capture a more photons than the 1.4 eV bandgap GaAs second absorber layer. The additional photons captured by the 1.2 eV InGaAs second absorber layer of the IMM cell increases the current density but the J-V curve is shifted to the left compared with the inverted $GaInP_2$/GaAs (first absorber layer/second absorber layer) because the lower bandgap material generates less voltage and is unable to split water at zero bias (short circuit). By incorporating a first absorber layer having a n-type layer on the surface of the IMM cell (positioned on a p-type layer), the J-V curve is shifted to the right and intersects the zero bias point at its maximum photocurrent density.

Table 4 below summarizes performance data for nine different first electrodes constructed with an IMM architecture having a p-n-type first absorber layer. The short-circuit current density ($J_{sc}$) density taken at zero bias vs. RuOx in two-terminal J-V measurements in 3M $H_2SO_4$ under simulated AM1.5G illumination appears in the first column. The solar-to-hydrogen (STH) efficiency (second column) is calculated by multiplying this number by 1.23 V and dividing by the power in 1-sun AM1.5G illumination (100 mW/cm$^2$).

TABLE 4

Performance data for different first electrodes constructed with p-n-type first absorber layers having IMM structure

|  | Jsc (mA/cm$^2$) | STH Efficiency (%) |
| --- | --- | --- |
| Electrode 1 | 12.8 | 15.7 |
| Electrode 2 | 12.9 | 15.9 |
| Electrode 3 | 13.1 | 16.1 |
| Electrode 4 | 12.9 | 15.9 |
| Electrode 5 | 12.4 | 15.3 |
| Electrode 6 | 13.2 | 16.2 |
| Electrode 7 | 12.7 | 15.6 |

TABLE 4-continued

Performance data for different first electrodes constructed with p-n-type first absorber layers having IMM structure

|  | Jsc (mA/cm$^2$) | STH Efficiency (%) |
| --- | --- | --- |
| Electrode 8 | 12.7 | 15.6 |
| Electrode 9 | 13.1 | 16.1 |
| Average | 12.9 | 15.8 |

Thus, in summary, monolithically integrated tandem electrodes having a wider bandgap first absorber layer (e.g. p-$GaInP_2$) integrated with a p/n-GaAs solar cell with a 1.4 eV bandgap may provide high STH values. The voltage from these series-connected absorber layers is the sum of the respective voltages for each individual absorber layer, but the overall device current, which is directly proportional to STH efficiency, is limited to that of the lower value between the two. In the p-$GaInP_2$/p/n-GaAs electrode embodiment, the GaAs is the current limiting junction; a greater spectral bandwidth may be achieved by lowering the bandgap of the bottom cell with the additional photons leading to augmented device current and efficiency.

Some embodiments of the present disclosure demonstrate an STH as high as 16% STH efficiency using an "inverted metamorphic multijunction" (IMM) growth, which has advantages over the upright growth scheme. In an inverted structure, the wider bandgap material, which will eventually be the top, illuminated side, is grown first since it is lattice matched to the GaAs substrate. This eliminates the need to have two metamorphic junctions and may result in higher quality material than can be obtained from upright metamorphic growth. After an IMM electrode is grown, a gold Ohmic contact may be applied, which may also serve as a back reflector, which may be subsequently transferred to a silicon handle substrate. A back reflector is able to increase the harvest of near-bandgap-energy photons compared with an upright structure where these photons, which are unabsorbed in the first pass of light through the material, is lost by passing through to the thick GaAs substrate. Once the IMM electrode is mounted to the Si handle, the GaAs substrate may be removed by selective etching, leaving the wider bandgap junction, which was grown first, as the outermost layer. The substrate removal step presents an opportunity to incorporate one of several emerging growth techniques that aim to reuse the GaAs substrate, such as spalling or epitaxial lift-off. The substrate is by far the largest cost driver for III-V material synthesis, so mitigating its contribution by dividing its expense over several hundred epitaxial growths can greatly reduce the cost of III-Vs by MOCVD; from tens of thousand dollars per m$^2$ to several hundred dollars per m$^2$.

Another advance provided in some embodiments of the present disclosure, is the use of a buried junction at the surface of the IMM structured first electrode. A buried junction may be produced by positioning a thin n-doped layer in contact with the outer p-$GaInP_2$ layer of the first absorber layer. This results in an improved open-circuit voltage by moving the location of the electric field from the interface with the electrolyte at the surface to a "buried" location that is entirely contained within the solid-state portion of the material. The effect of this buried junction is to shift the J-V (current density-potential) curve to more positive potentials so the maximum, or light-limited photocurrent density, can be achieved at short circuit, as illustrated in FIG. 10.

Thus, to exceed high STH efficiencies, some embodiments of the present disclosure implement several approaches. A first approach increases the photocurrent through photon management. The surface of the first absorber layer may be highly reflective due to the large difference in refractive indices between the semiconductor (n=3.5) and electrolyte (n=1.3). The reflective loss is lower in electrolyte than in air, but the losses due to reflection at the semiconductor/electrolyte interface is approximately 30% over the range of absorbed photon energies. Adding an antireflective layer to the surface, such as $TiO_2$, can boost the light limited photocurrent density by 20%, which can increase the STH by up to 4 percentage points, without modifying the underlying absorber layers. An anti-reflective coating (ARC) should be transparent, stable when in contact with electrolyte, and should not hinder the transfer of electrons from the semiconductor to the electrolyte. Beyond simple index matching for anti-reflection, the thickness of the ARC may be tuned to take advantage of interference. Furthermore, the thickness of an ARC may be optimized to increase the current in the current-limiting junction, which should increase the overall device current.

A second approach to achieving higher photocurrents is to lower the bandgap of the first absorber layer. By reducing the bandgap from 1.8 eV to 1.7 eV, an additional 3 mA/cm$^2$, which is found by integrating the photon flux in the AM1.5 G solar spectrum between these two points, may be available to the water-splitting device. Thus, some embodiments of the present disclosure were able to increase the STH efficiency by constructing first electrodes having inverted metamorphic multi junction structures, which allow unrestricted selection of materials with bandgaps ideal for solar water-splitting applications. By lowering the bottom junction bandgap, a greater fraction of the solar spectrum is available to split between the two junctions. In addition, first electrodes having first absorber layers with buried junctions are able to improve the $V_{oc}$, which compensates for the voltage lost due to using a lower bandgap bottom junction. In addition, anti-reflective coatings can improve the photocurrent density by up to 20% by coupling a larger fraction of impingent photons into the device.

EXAMPLE 5

This example provides some of the details for a PEC device with an STH efficiency close to 16%. The first electrode of the PEC device was grown by metal-organic vapor-phase epitaxy (MOVPE) on a GaAs substrate. In this example, the first absorber layer of the structure was composed of a 25 nm-thick selenium-doped n-type $Ga_{0.5}In_{0.5}P$ layer, a 2 µm-thick zinc-doped p-type $Ga_{0.5}In_{0.5}P$ layer, and a 50 nm thick zinc-doped p-type $Al_{0.27}Ga_{0.24}In_{0.49}P$ layer to provide back-surface passivation to the first absorber layer. This first absorber layer was lattice-constant-matched to the GaAs substrate. A tunnel junction having a 20 nm thick carbon-doped p-type $Al_{0.3}Ga_{0.7}As$ layer followed by a 12 nm thick selenium-doped n-type GaAs layer were deposited on the first absorber layer, with the 20 nm thick carbon-doped p-type $Al_{0.3}Ga_{0.7}As$ layer deposited directly onto the 50 nm thick zinc-doped p-type $Al_{0.27}Ga_{0.24}In_{0.49}P$ layer of the first absorber layer. Next, a graded buffer layer was deposited onto the tunnel junction, where the grader buffer layer had 11 sublayers, each constructed of a silicon-doped n-type $Al_yGa_xIn_{1-x-y}P$ alloy, with the composition x and y adjusted through the layers of the buffer to transition its lattice constant of GaAs substrate to the lattice constant of the second absorber layer. The second absorber layer was then deposited onto the graded buffer layer. The second absorber layer was composed of a 0.2-µm-thick silicon-doped n-type $Al_{0.2}Ga_{0.2}In_{0.6}P$ layer, a 2-µm-thick zinc-doped p-type $Ga_{0.9}In_{0.1}As$ layer, and a 0.3-µm-thick zinc-doped p-type $Ga_{0.4}In_{0.6}P$ layer to provide back-surface passivation to the second absorber layer. Finally, a 0.1-µm-thick zinc-doped p-type $Ga_{0.9}In_{0.1}As$ layer was deposited onto the second absorber layer to provide an electrical contact layer, and resulting in a nearly complete first electrode.

The first electrode was completed by electroplating a gold layer onto the 0.1-µm-thick zinc-doped p-type $Ga_{0.9}In_{0.1}As$ layer, to provide an electrical contact as well as a very high degree of optical reflectivity. The device was then bonded gold-side-down to a rigid "handle" for mechanical strength, and the GaAs substrate was removed by selective wet-chemical etching.

Removal of the GaAs substrate exposed the first absorber layer, onto which a $Pt_{0.5}Ru_{0.5}$ nanoparticle catalyst of approximately 1-5 nm diameter was sputtered, covering approximately 10-50% of the areal surface. The perimeter of the structure was then etched away to make accessible the gold back electrical contact and define an active device mesa. An insulating photoresist (SU-8) was applied via photolithographic processes to encapsulate an approximately 0.5 mm wide perimeter of the device mesa and the gold back electrical contact with the exception of a 2 mm diameter area of the gold back contact, which served as a contact pad. The structure and handle were then assembled into a photoelectrode first by mounting it onto a glass slide with epoxy to facilitate handling. Copper tape and conductive silver paint provided an electrical lead to the back contact pad. The remaining handle perimeter, copper tape, and silver paint were covered with insulating epoxy to provide electrical isolation for the final complete photoelectrochemical cell (e.g. with a second electrode and electrolyte).

The final photoelectrochemical cell was a rectangular, glass beaker filled with 3M sulfuric acid electrolyte containing 1 mM Triton X-100 surfactant. The photoelectrode assembly was submerged in the electrolyte and electrically connected through a potentiostat to a counter electrode (e.g. the second electrode) constructed of a sputtered $IrO_x$ film on glass substrate ($RuO_x$ could also be used as a counter electrode, or Pt black). Current-voltage measurements were performed via the potentiostat while the photoelectrode was illuminated by a solar simulator with a solar intensity set using a calibrated $GaInP_2$ reference solar cell and its spectrum recorded using a spectroradiometer.

EXAMPLE 6

In some embodiments of the present invention, a first electrode structure may use a second absorber layer constructed of a "dilute-nitride" material $In_zGa_{1-z}N_qSb_rAs_{1-q-r}$ (q=0.01 to 0.03, z≈3*q, with r=0 to 0.1). In this example, the second absorber layer is grown first, onto the GaAs substrate, with a composition as specified above, which is lattice-matched to GaAs. The tunnel junction may then be deposited onto the second absorber layer, followed subsequently by deposition of the first absorber layer onto the second absorber layer. The first absorber layer may have a composition as described herein (e.g. see Example 5). This order of growth (second absorber layer first, followed subsequently by the first absorber layer) is the opposite as in Example 5, because the entire structure may be grown lattice-matched to GaAs, such that the substrate does not need to be removed. After growth of the semiconductor structure, the GaAs substrate may remain as part of the final first electrode structure. A planar metallic back contact may be applied to the back side of the GaAs substrate. The subsequent processing and use of the device may then proceed similarly to the steps described above for Example 5, following the substrate removal. For example, some embodiments of the present invention a first electrode with a non-IMM structure may have a first absorber layer constructed of at least one alloy such as $Al_{1-x}Ga_xAs$ where x is approximately equal to 0.77, GaInAsP, GaInP, and/or AlGaAs, and/or a heterojunction of any two of these alloys. In some embodiments, a first electrode with a non-IMM structure may have a second absorber layer constructed of an alloy such as $In_zGa_{1-z}N_qSb_rAs_{1-q-r}$ where q is between about 0.01 and about 0.03, z is between about 0.03 and about 0.08, and r is between about 0.0 and about 0.1.

What is claimed is:

1. A photoelectrochemical device comprising:
    a first electrode comprising, in order:
        a hydrogen generating catalyst
        a first absorber layer comprising a first n-type layer in contact with the hydrogen generating catalyst, and a first p-type layer;
        a graded buffer layer comprising at least one of aluminum or phosphorous and having a bandgap of greater than 1.2 eV;
        a second absorber layer comprising a second n-type layer in contact with the graded buffer layer, and a second p-type layer; and
        a contact layer comprising at least one reflective metal in contact with the second p-type layer, wherein:
        the first n-type layer and the first p-type layer comprise $Ga_xIn_yP$,
        the second n-type layer and the second p-type layer comprise $Ga_tIn_uAs$,
        the first absorber layer has a first bandgap between 1.6 eV and 1.8 eV, inclusively,
        the second absorber layer has a second bandgap between 0.9 eV and 1.2 eV, inclusively,
        x, y, t, and u are each between greater than 0.0 and 1.0, and
        $x+y=t+u=1.0$.

2. The photoelectrochemical device of claim 1, wherein the first bandgap is 1.8 eV.

3. The photoelectrochemical device of claim 1, wherein the second bandgap is 1.2 eV.

4. The photoelectrochemical device of claim 1, wherein x is between 0.4 and 1.0, inclusively.

5. The photoelectrochemical device of claim 1, wherein the first p-type layer includes a first dopant comprising at least one of zinc, beryllium, magnesium, or carbon.

6. The photoelectrochemical device of claim 1, wherein the first n-type layer includes a second dopant comprising at least one of selenium, silicon, tellurium, sulfur, or germanium.

7. The photoelectrochemical device of claim 1, wherein the first absorber layer has a thickness between 500 nm and 3000 nm.

8. The photoelectrochemical device of claim 1, wherein u is between 0.15 and 0.35, inclusively.

9. The photoelectrochemical device of claim 1, wherein the second p-type layer includes a third dopant comprising at least one of zinc, beryllium, magnesium, or carbon.

10. The photoelectrochemical device of claim 1, wherein the second n-type layer includes a fourth dopant comprising at least one of selenium, silicon, sulfur, or germanium.

11. The photoelectrochemical device of claim 1, wherein the second absorber layer has a thickness between 1000 nm and 3000 nm.

12. The photoelectrochemical device of claim 1, wherein the reflective metal comprises at least one of gold, silver, platinum, or copper.

13. The photoelectrochemical device of claim 1, further comprising a tunnel junction positioned between the first absorber layer and the graded buffer layer.

14. The photoelectrochemical device of claim 1, wherein the graded buffer layer comprises between 3 and 20 graded layers.

15. The photoelectrochemical device of claim 14, wherein the bandgap of the graded buffer layer is greater than 1.8 eV.

16. The photoelectrochemical device of claim 14, wherein:
    each graded layer has a composition comprising $Ga_aIn_bAl_cP$,
    a is between 0.19 and 0.51, inclusively,
    b is between 0.49 and 0.63, inclusively,
    c is between zero and 0.18, inclusively, and
    $a+b+c=1.0$.

17. The photoelectrochemical device of claim 1, wherein the hydrogen generating catalyst comprises ruthenium.

18. The photoelectrochemical device of claim 1, further comprising a second electrode, wherein the first electrode and the second electrode are electrically connected.

19. The photoelectrochemical device of claim 18, further comprising an electrolyte positioned between the first electrode and the second electrode.

20. The photoelectrochemical device of claim 19, wherein the photoelectrochemical device is capable of generating a $J_{sc}$ of greater than 13 mA/cm$^2$ with a corresponding solar-to-hydrogen efficiency of greater than 16%, when the first electrode is exposed to simulated AM1.5G illumination.

21. The photoelectrochemical device of claim 1, wherein the first absorber layer further comprises nitrogen.

22. The photoelectrochemical device of claim 1, wherein the first absorber layer comprises $Ga_{0.51}In_{0.49}P$.

23. The photoelectrochemical device of claim 1, wherein the second absorber layer comprises $Ga_{0.85}In_{0.15}As$.

* * * * *